United States Patent
Zhang et al.

(10) Patent No.: US 8,337,088 B2
(45) Date of Patent: Dec. 25, 2012

(54) SHOCK ABSORPTION DEVICE FOR MOTOR BEARING SYSTEM

(75) Inventors: Shen Zhang, Zhongshan (CN); Yingcheng Li, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/230,813

(22) Filed: Sep. 12, 2011

(65) Prior Publication Data
US 2012/0002908 A1 Jan. 5, 2012

Related U.S. Application Data

(63) Continuation of application No. PCT/CN2010/070354, filed on Jan. 26, 2010.

(30) Foreign Application Priority Data

Apr. 3, 2009 (CN) .................. 2009 2 0054150 U

(51) Int. Cl.
*F16C 23/00* (2006.01)
*F16C 25/00* (2006.01)
(52) U.S. Cl. .................. 384/223; 384/108; 384/241
(58) Field of Classification Search .............. 384/99, 384/145, 203, 206, 209, 219, 223, 235, 108, 384/213, 241; 267/33–34, 220–221
See application file for complete search history.

(56) References Cited

U.S. PATENT DOCUMENTS

| | | | | |
|---|---|---|---|---|
| 2,729,518 A | * | 1/1956 | O'Connor | 384/99 |
| 3,339,988 A | * | 9/1967 | Schultze | 384/145 |
| 3,953,010 A | * | 4/1976 | de Vos | 267/220 |
| 4,434,977 A | * | 3/1984 | Chiba et al. | 267/33 |
| 4,562,997 A | * | 1/1986 | Iwata et al. | 267/221 |
| 4,779,855 A | * | 10/1988 | Tanaka | 384/203 |
| 5,092,898 A | * | 3/1992 | Bekki et al. | 623/22.16 |
| 2006/0241767 A1 | * | 10/2006 | Doty | 623/17.12 |

FOREIGN PATENT DOCUMENTS

| | | | |
|---|---|---|---|
| EP | 1110843 A1 | * | 6/2001 |
| EP | 1609632 A2 | * | 12/2005 |
| FR | 2820477 A1 | * | 8/2002 |
| JP | 58170613 A | * | 10/1983 |
| JP | 08042621 A | * | 2/1996 |
| WO | WO 03020541 A1 | * | 3/2003 |

* cited by examiner

*Primary Examiner* — Marcus Charles
(74) *Attorney, Agent, or Firm* — Matthias Scholl P.C.; Matthias Scholl

(57) ABSTRACT

A shock absorption device for a motor bearing system, including a washer, an end cover, a bearing, a rotating shaft, a retaining ring, a cap, and a shock absorption pad. The bearing is disposed in a bearing seat of the end cover. The rotating shaft abuts against the bearing. The washer is disposed on the rotating shaft and on one side of the bearing. The retaining ring is buckled on the rotating shaft and axially positions the washer. The cap is disposed on the periphery of the washer, and on the end cover. The shock absorption pad is disposed on the end cover. The washer is disposed between the shock absorption pad and the retaining ring. The shock absorption pad axially separates the washer from the bearing, and end surface of the bearing seat.

8 Claims, 9 Drawing Sheets

SHOCK ABSORPTION DEVICE FOR MOTOR BEARING SYSTEM

CROSS-REFERENCE TO RELATED APPLICATIONS

This application is a continuation of International Patent Application No. PCT/CN2010/070354 with an international filing date of Jan. 26, 2010, designating the United States, now pending, and further claims priority benefits to Chinese Patent Application No. 200920054150.5 filed on Apr. 3, 2009. The contents of all of the aforementioned applications, including any intervening amendments thereto, are incorporated herein by reference.

BACKGROUND OF THE INVENTION

1. Field of the Invention

The invention relates to a shock absorption device for a motor bearing system.

2. Description of the Related Art

As shown in FIG. 1, a conventional motor bearing system is illustrated, and comprises an end cover 26, a rotating shaft 29, a bearing 27, a cap 28, a retaining ring 21, and a washer. The washer comprises a positioning retaining ring 22, an adjusting retaining ring 23, a rubber washer 24, and a wear-resistant pad 25. An oil-storage groove 30 is disposed on the end cover 26, the washer is laminar, radial dimension thereof is approximately the same, and a gap exists between the cap 28 and the washer. However, the structure has the following disadvantages: 1) during starting of the motor, due to problems with assembly accuracy thereof, a motor shaft is to axially move during starting, namely a rotor moves back and forth, and the retaining ring 21 and the washer disposed on the motor shaft axially move along therewith, and thus the washer is contacted with end surface of the end cover 26 or the bearing 27, which generates impact noise, or even damages components; 2) during operation of the motor, the washer is forced to abut against the end surface of the end cover 26 or the bearing 27, since the end surface thereof is comparatively rough, noise is generated during rotation of the motor, which leads to severe abrasion thereof, and failure of the washer; 3) the rubber washer used by the washer is affected by temperature of the motor, and easily becomes aged and fails; and 4) the number of components of the washer is too large, which leads to complex structure, troublesome installation, and high cost.

SUMMARY OF THE INVENTION

In view of the above-described problem, it is an objective of the invention to provide a shock absorption device for a motor bearing system that is capable of addressing the above-mentioned problems.

To achieve the above objectives, in accordance with one embodiment of the invention, provided is a shock absorption device for a motor bearing system, comprising a washer, an end cover, a bearing, a rotating shaft, a retaining ring, a cap, and a shock absorption pad, the bearing is disposed in a bearing seat of the end cover, the rotating shaft abuts against the bearing, the washer is disposed on the rotating shaft and on one side of the bearing, the retaining ring is buckled on the rotating shaft and axially positions the washer, the cap is disposed on the periphery of the washer, and on the end cover, the shock absorption pad is disposed on the end cover, the washer is disposed between the shock absorption pad and the retaining ring, and the shock absorption pad axially separates the washer from the bearing, and end surface of the bearing seat.

In a class of this embodiment, the shock absorption pad is a steel pad, axial distance between one side of the steel pad, and the end surface of the bearing seat ranges from 0.5 mm to 1.5 mm, and the steel pad is triangular or elliptical.

In a class of this embodiment, a center hole in the middle of the shock absorption pad passes through the rotating shaft, and an oil-return hole or no oil-return hole is disposed on the periphery of the center hole.

In a class of this embodiment, a circular flange is disposed on the end cover, a step is disposed on end surface of the circular flange, the edge of the shock absorption pad is received in the step, and the cap is fit on the circular flange, and presses the shock absorption pad.

In a class of this embodiment, a first oil retainer is disposed on one side of the washer, at least one oil-storage groove is disposed on the surface of the first oil retainer, and the surface of the first oil retainer faces the bearing and the end cover.

In a class of this embodiment, a second oil retainer is disposed at the back of the first oil retainer, a transition groove is disposed between the first oil retainer and the second oil retainer, and the transition groove is an annular groove.

In a class of this embodiment, the oil-storage groove is an annular groove, or a radial groove.

In a class of this embodiment, a diameter of the second oil retainer is greater than that of the first oil retainer, an annular flange axially extends from the first oil retainer, and a flange axially extends from the second oil retainer.

Advantages of the invention over the prior art comprise: 1) the washer is disposed between the shock absorption pad and the retaining ring, and the shock absorption pad axially separates the washer from the bearing and the end cover, during starting of the motor, even if the rotor axially moves, the washer only knocks against the shock absorption pad, and the shock absorption pad has certain elasticity, and thus being capable of reducing shock and noise generated by knocking, and having a good buffering effect; 2) during operation of the motor, with axial movement of the rotating shaft, surface of the first oil retainer of the washer is attached to that of the shock absorption pad, since the shock absorption pad is a steel pad with very smooth surface, the oil-storage groove is disposed on the surface of the first oil retainer, and oil film is formed on the surface of the first oil retainer during operation thereof, and greatly reduces friction between the shock absorption pad, and the first oil retainer of the washer (approximately no friction exists). Therefore, work life of the washer is greatly increased; 3) the rubber washer, the adjusting washer, and the wear-resistant pad in the prior art are eliminated, which makes the invention have simple structure, convenient installation, and low production cost; 4) the first oil retainer, the second oil retainer, and the transition groove disposed on the washer have good oil retaining and return effect, and thus increasing work life of the motor.

DETAILED DESCRIPTION OF THE EMBODIMENTS

Figure 1:
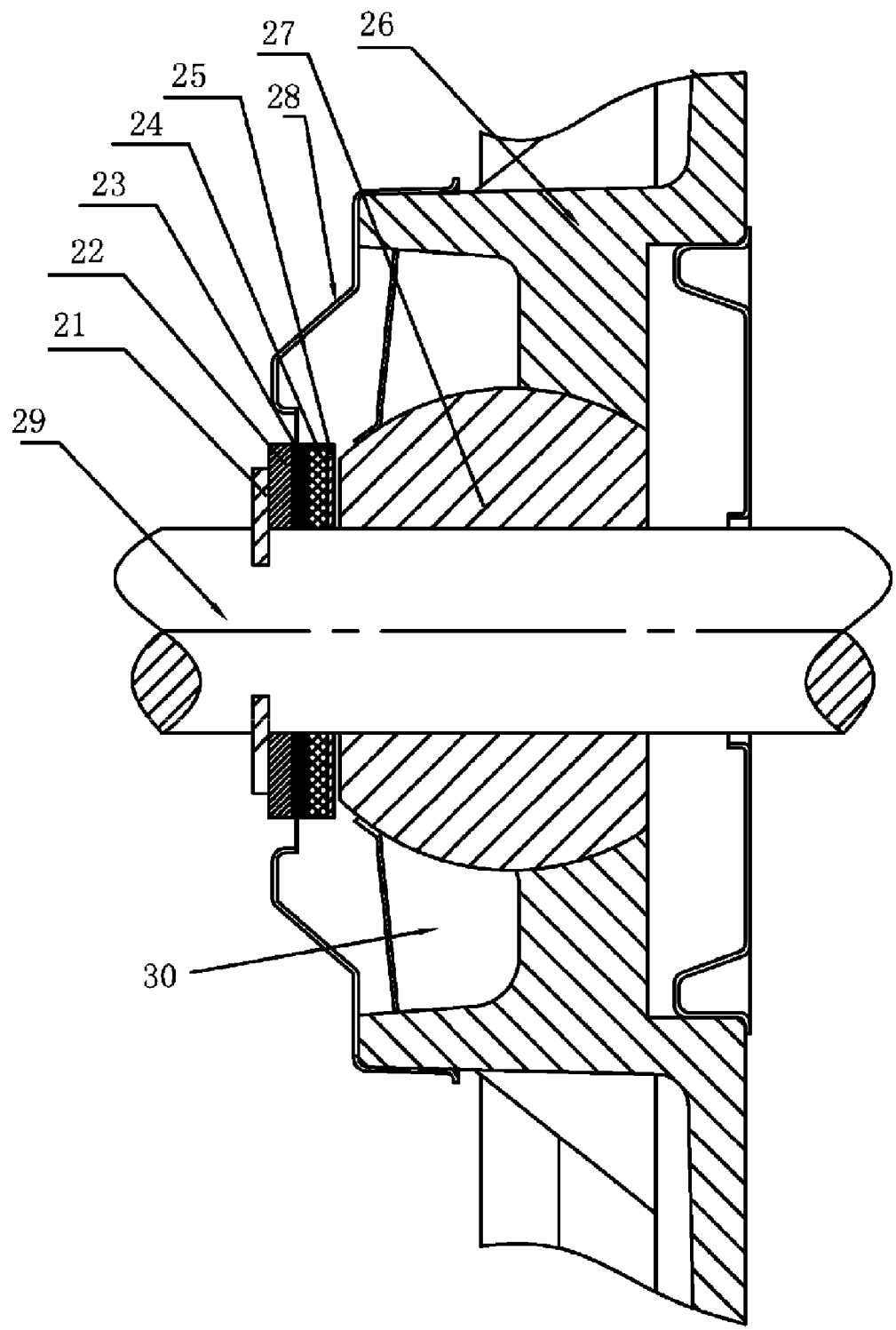
FIG. 1 is a schematic view of a motor bearing system in the prior art.
Figure 2:
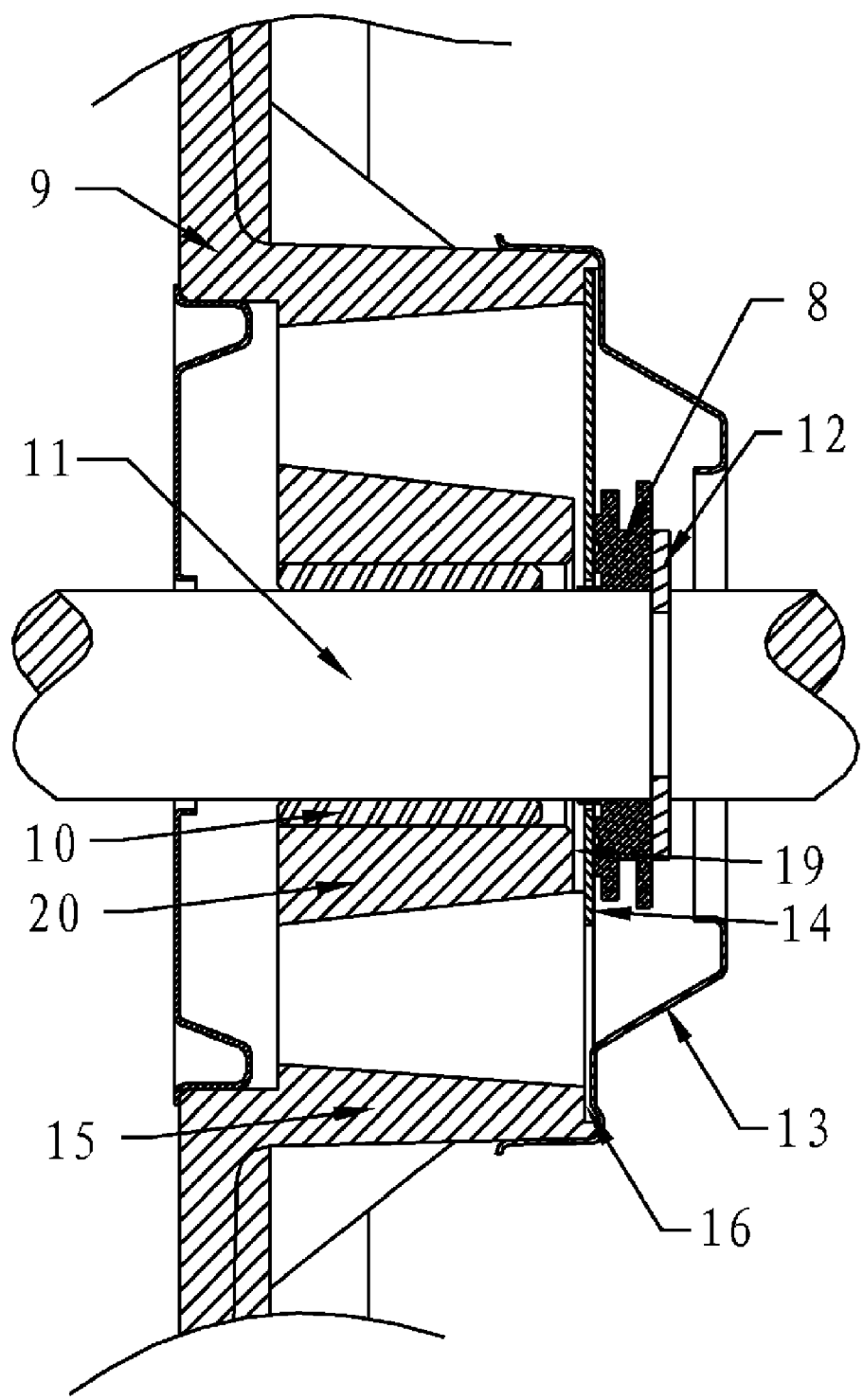
FIG. 2 is a cross-sectional view of a shock absorption device for a motor bearing system of an embodiment of the invention.
Figure 3:
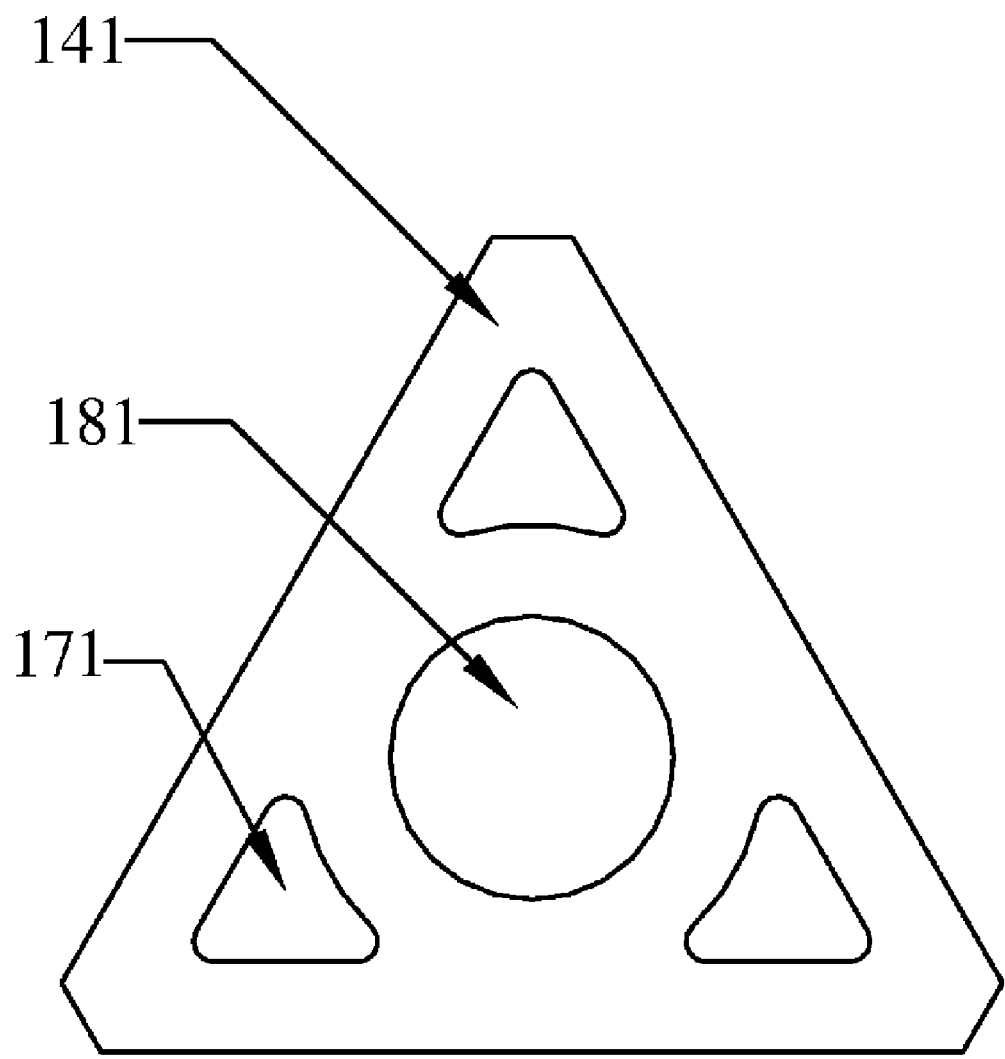
FIG. 3 is a schematic view of a shock absorption pad of a first embodiment of the invention.
Figure 4:
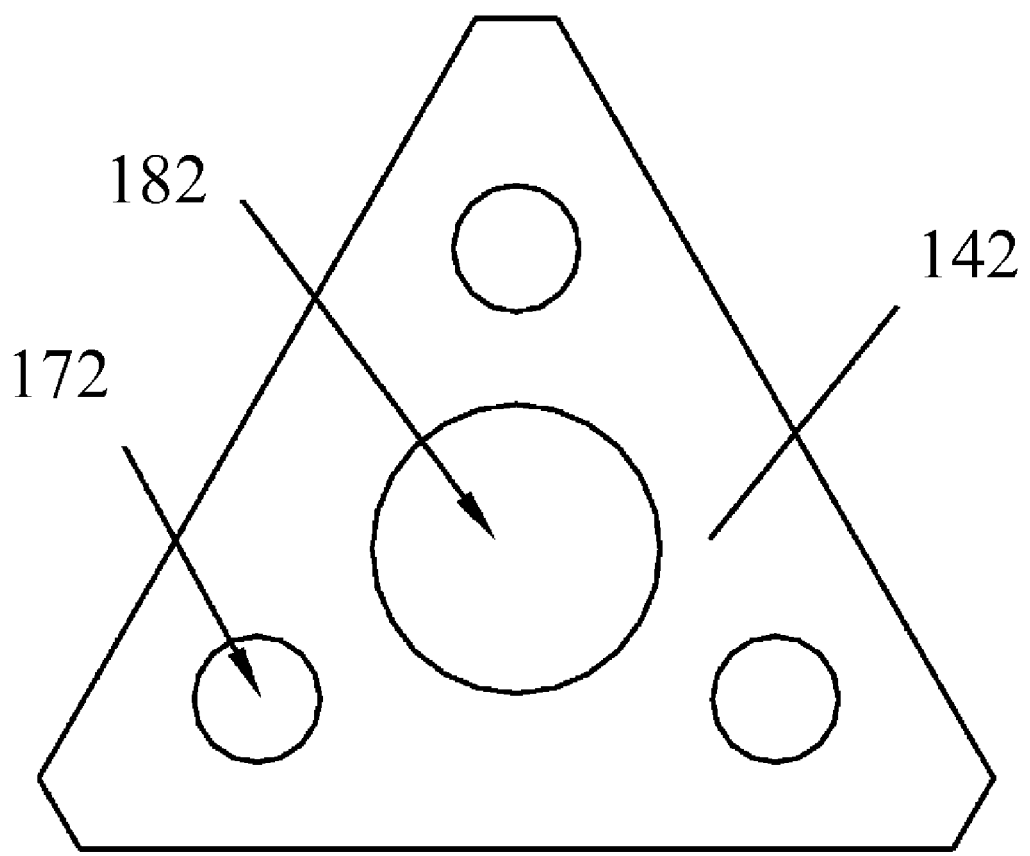
FIG. 4 is a schematic view of a shock absorption pad of a second embodiment of the invention.
Figure 5:
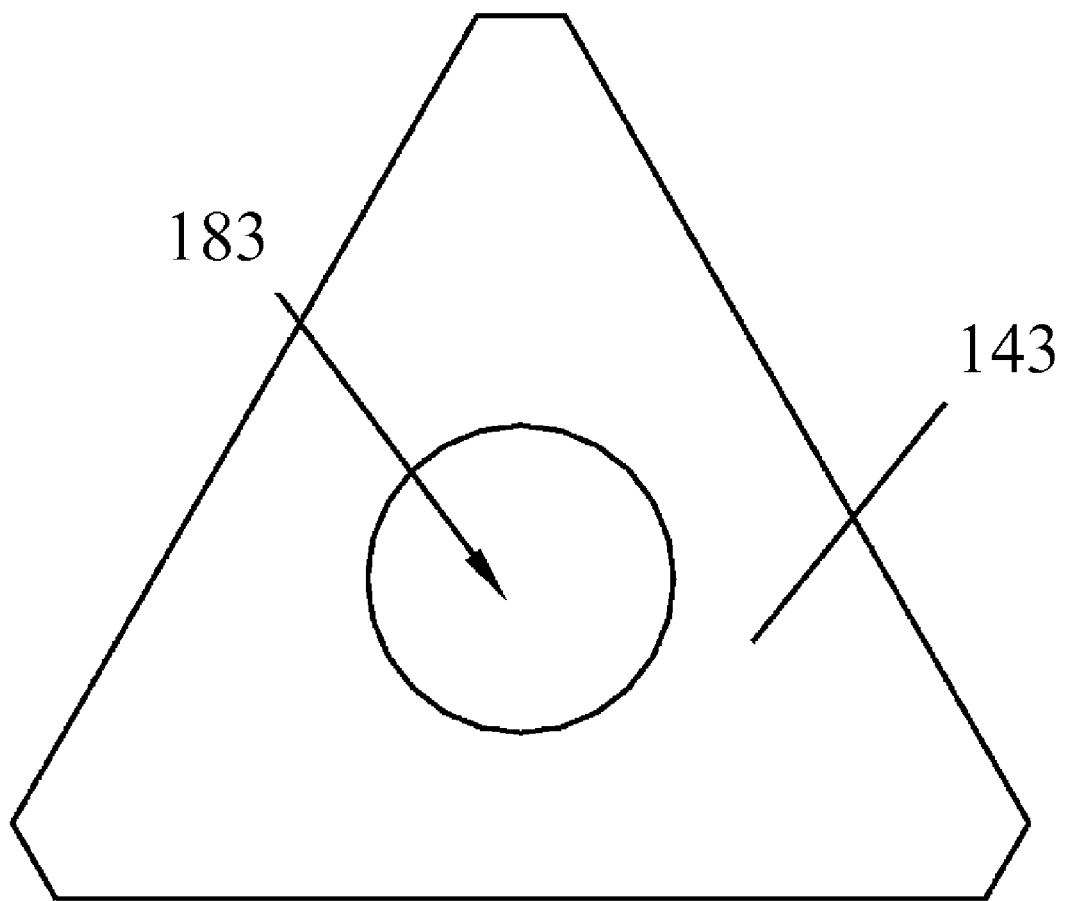
FIG. 5 is a schematic view of a shock absorption pad of a third embodiment of the invention.
Figure 6:
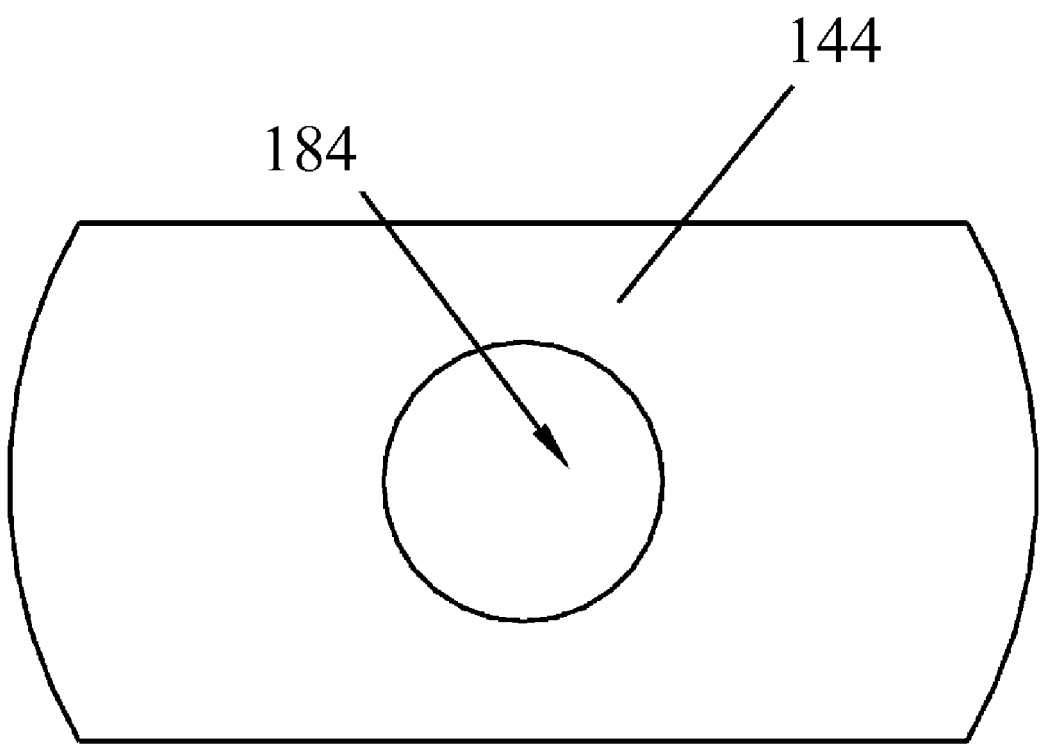
FIG. 6 is a schematic view of a shock absorption pad of a fourth embodiment of the invention.

Further description will be given below in conjunction with specific embodiments and accompanying drawings.

As shown in FIGS. 2 to 6, a shock absorption device for a motor bearing system of the invention, comprises a washer 8, an end cover 9, a bearing 10, a rotating shaft 11, a retaining ring 12, a cap 13, and a shock absorption pad 14.

The bearing 10 is disposed in a bearing seat 20 of the end cover 9, the rotating shaft 11 abuts against the bearing 10, the washer 8 is disposed on the rotating shaft 11 and on one side of the bearing 10, the retaining ring 12 is buckled on the rotating shaft 11 and axially positions the washer 8, the cap 13 is disposed on the periphery of the washer 8, and on the end cover 9, the shock absorption pad 14 is disposed on the end cover 9, the washer 8 is disposed between the shock absorption pad 14 and the retaining ring 12, and the shock absorption pad 14 axially separates the washer 8 from the bearing 10, and end surface 10 of the bearing seat 20.

The shock absorption pad 14 is a steel pad, axial distance between one side of the steel pad, and the end surface 19 of the bearing seat 20 ranges from 0.5 mm to 1.5 mm, and the steel pad is triangular or elliptical.

A center hole 18 in the middle of the shock absorption pad 14 passes through the rotating shaft 11, and an oil-return hole 17 or no oil-return hole 17 is disposed on the periphery of the center hole 18.

A circular flange 15 is disposed on the end cover 9, a step 16 is disposed on end surface of the circular flange 15, the edge of the shock absorption pad 14 is received in the step 16, and the cap 13 is fit on the circular flange 15, and presses the shock absorption pad 14.

Figure 7:
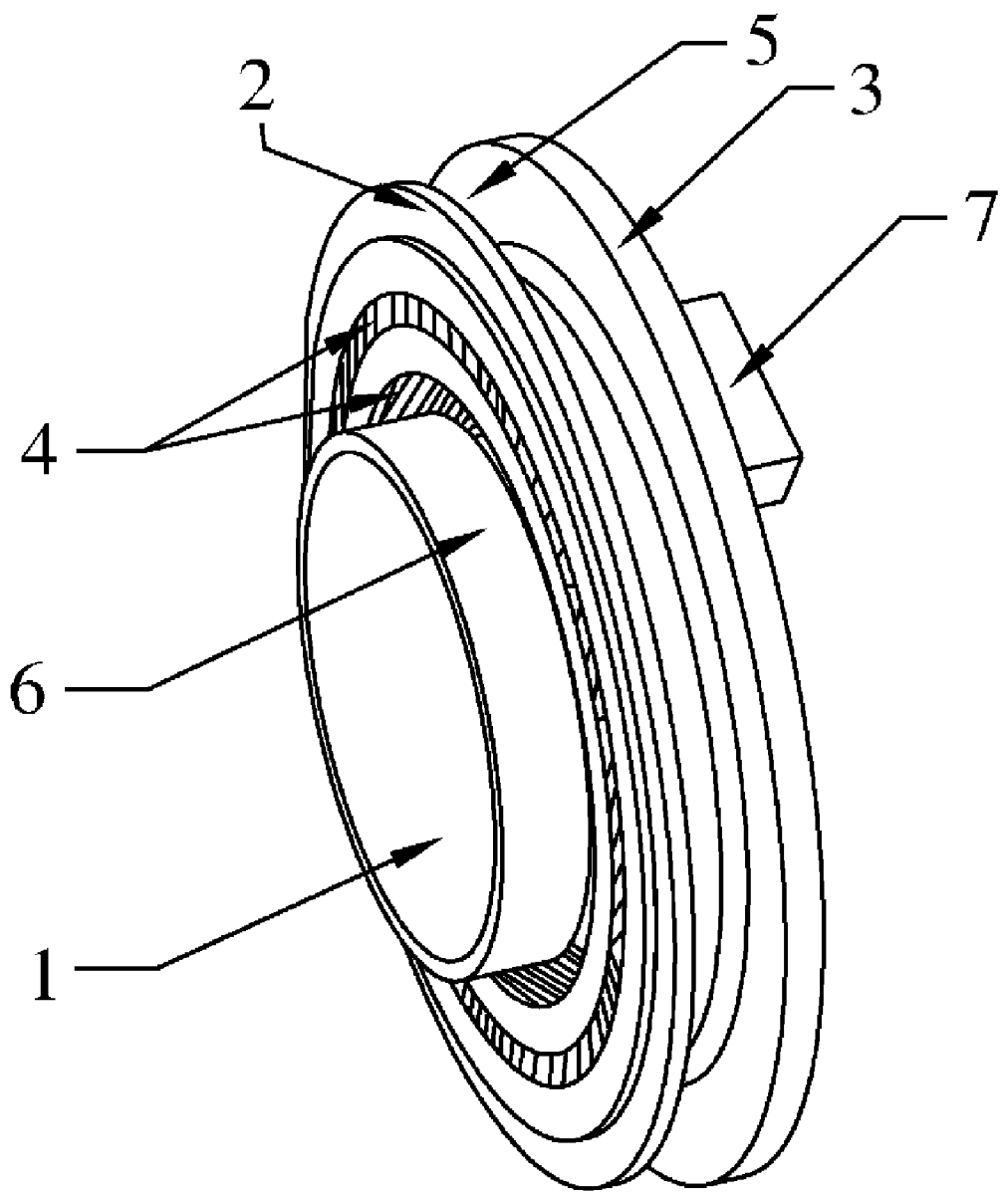
FIG. 7 is a perspective view of a washer of a first embodiment of the invention.
Figure 8:
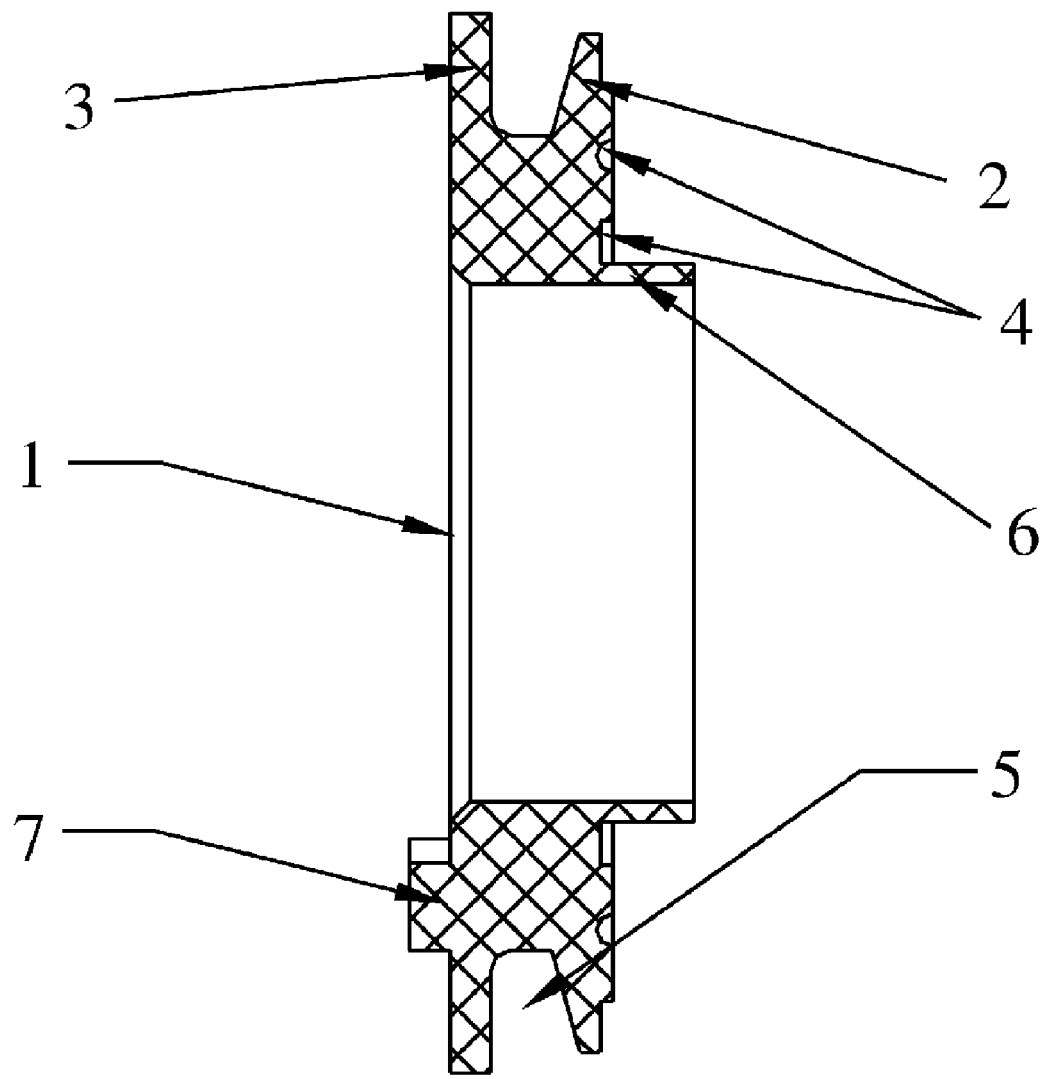
FIG. 8 is a cross-sectional view of a washer of a first embodiment of the invention.
Figure 9:
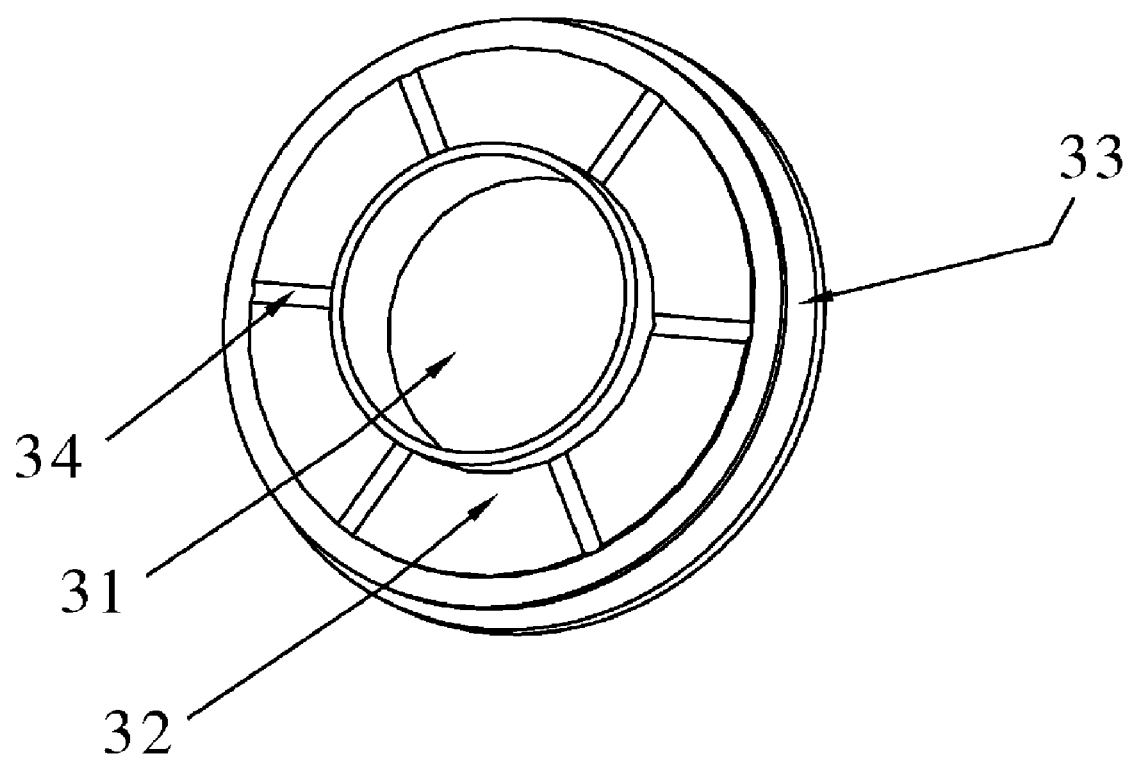
FIG. 9 is a perspective view of a washer of a second embodiment of the invention.

As shown in FIGS. 7 and 8, a central axial hole 1 allowing a motor shaft to pass therethrough is disposed on the washer 8. A first oil retainer 2 is formed on one side of the washer. At least one oil-storage groove 4 is disposed on the surface of the first oil retainer 2. The oil-storage groove 4 is an annular groove. A second oil retainer 3 is disposed at the back of the first oil retainer 2. A diameter of the second oil retainer 3 is greater than that of the first oil retainer 2, and a transition groove 5 is disposed between the first oil retainer 2 and the second oil retainer 3. The transition groove 5 is an annular groove. An annular flange 6 axially extends from the first oil retainer 2, and a flange 7 axially extends from the second oil retainer 3. As shown in FIG. 9, the oil-storage groove 4 can be a radial groove. The flange 7 is integrated with the retaining ring 12, and the retaining ring 12 axially positions the washer 8. During operation, the retaining ring 12 and the washer 8 rotate along with the rotating shaft 11.

The washer composed of the first oil retainer 2, the second oil retainer 3, and the transition groove 5 features good oil retaining and return effect, enables lubricating oil to be cyclically utilized in the oil bearing system of the motor, and cooperates with an oil cap 13 to effectively prevent the lubricating oil from enter the motor body and affecting normal operation of the motor, which improve work life of the motor. The oil-storage groove 4 disposed on the surface of the first oil retainer 2 of the washer 8 allows oil film to be formed on the surface of the first oil retainer 2 and contacted with surface of the shock absorption pad 14 being a steel pad, which reduces friction, and thus abrasion is slight, and work life is greatly increased.

Operation principle of the invention is: during starting of the motor, the rotating shaft 11, and the washer 8 disposed on the rotating shaft 11 axially move, and the washer knocks against the shock absorption pad 14. Since the shock absorption pad 14 has certain elasticity, and thus being capable of buffering, and reducing shock and noise. As the rotating shaft rotates at high speed, the oil-storage groove 4 disposed on the surface of the first oil retainer 2 of the washer 8 enables oil film to be formed on the surface of the first oil retainer 2 during operation thereof, and to be contacted with the surface of the shock absorption pad 14, namely the steel pad, which greatly reduces friction, and thus abrasion thereof is small, work life thereof is greatly increased. Moreover, the surface of the steel pad can be made very smooth, which further reduces friction and abrasion.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A shock absorption device for a motor bearing system, the shock absorption device comprising:
 a washer (8);
 an end cover (9);
 a bearing (10);
 a rotating shaft (11);
 a retaining ring (12);
 a cap (13); and
 a shock absorption pad (14); wherein:
 said bearing (10) is disposed in a bearing seat (20) of said end cover (9);
 said rotating shaft (11) abuts against said bearing (10);
 said washer (8) is disposed on said rotating shaft (11) and on one side of said bearing (10);
 said retaining ring (12) is buckled on said rotating shaft (11) and axially positions said washer (8);
 said cap (13) is disposed on the periphery of said washer (8), and on said end cover (9);
 said shock absorption pad (14) is disposed on said end cover (9);
 said washer (8) is disposed between said shock absorption pad (14) and said retaining ring (12); and
 said shock absorption pad (14) axially separates said washer (8) from said bearing (10), and end surface (19) of said bearing seat (20).

2. The shock absorption device of claim 1, wherein
 said shock absorption pad (14) is a steel pad;
 axial distance between one side of said steel pad, and said end surface (19) of said bearing seat (20) ranges from 0.5 mm to 1.5 mm; and
 said steel pad is triangular or elliptical.

3. The shock absorption device of claim 2, wherein
 a center hole (18) in the middle of said shock absorption pad (14) passes through said rotating shaft (11); and
 an oil-return hole (17) or no oil-return hole (17) is disposed on the periphery of said center hole (18).

4. The shock absorption device of claim 3, wherein
a circular flange (15) is disposed on said end cover (9);
a step (16) is disposed on end surface of said circular flange (15);
the edge of said shock absorption pad (14) is received in said step (16); and
said cap (13) is fit on said circular flange (15), and presses said shock absorption pad (14).

5. The shock absorption device of claim 3, wherein
a first oil retainer (2) is disposed on one side of said washer (8);
at least one oil-storage groove (4) is disposed on the surface of said first oil retainer (2); and
the surface of said first oil retainer (2) faces said bearing (10) and said end cover (9).

6. The shock absorption device of claim 5, wherein
a second oil retainer (3) is disposed at the back of said first oil retainer (2);
a transition groove (5) is disposed between said first oil retainer (2) and said second oil retainer (3); and
said transition groove (5) is an annular groove.

7. The shock absorption device of claim 6, wherein said oil-storage groove (4) is an annular groove, or a radial groove.

8. The shock absorption device of claim 7, wherein
a diameter of said second oil retainer (3) is greater than that of said first oil retainer (2);
an annular flange (6) axially extends from said first oil retainer (2); and
a flange (7) axially extends from said second oil retainer (3).

* * * * *